Nov. 7, 1967 N. R. ORTWEIN ET AL 3,351,940

MICROWAVE TRANSHORIZON BROADCAST RADIO SYSTEM

Filed April 6, 1965 2 Sheets-Sheet 1

INVENTORS

NORMAN R. ORTWEIN
CLARK A. POTTER

ATTORNEYS

INVENTORS
NORMAN R. ORTWEIN
CLARK A. POTTER

ATTORNEYS 3,351,940
MICROWAVE TRANSHORIZON BROADCAST RADIO SYSTEM

Norman R. Ortwein, San Diego, and Clark A. Potter, La Jolla, Calif., assignors to the United States of America as represented by the Secretary of the Navy Filed Apr. 6, 1965, Ser. No. 448,560
5 Claims. (Cl. 343—100)

ABSTRACT OF THE DISCLOSURE

Back-to-back narrow beam antennas on ships at sea are rotated on vertical axes in synchronism and in phase. A transmitter is connected to one antenna and a receiver to the other. Once each revolution, for a short period the transmitted beam of ship A can illuminate the receiver antenna of ship B, and during that period a burst of information data can be transmitted without fear of interception.

The invention described herein may be manufactured and used by or for the Government of the United States of America for governmental purposes without the payment of any royalties thereon or therefor.

This invention relates to radio communication systems and is particularly directed to a means of providing two-way contact among two or more mobile transmitter-receiver stations which are not within line of sight of each other, which will operate in a post-nuclear blast environment and which is difficult to intercept and/or disrupt.

Present methods for transhorizon communications between mobile stations are either limited to low data rates or are subject to ionospheric disturbances. The proposed invention provides either uninterrupted broadcast operation at data rates similar to current practice or much higher data rates when operated in a point-to-point mode. It uses the phenomenon of weak random scattering of microwave energy by tropospheric inhomogeneities, high-gain, highly-directional synchronously rotating antenna beams, together with controlled burst transmissions which are modulated at rates much higher than the data rates of the terminal equipment. The combination of rotating narrow-beam antennas, synchronous burst transmissions and operation in the microwave portion of the spectrum where many channels are available for frequency jumping, provides a degree of security against interception or jamming. The use of tropospheric scattering permits operation immediately after a series of nuclear detonations which may disrupt the ionosphere severely enough to prevent transhorizon communications by normal radio links.

The essential feature of this invention is the efficient packaging of information-bearing energy in time and space. At any station, a message intended for a specific second station is transmitted only when the antennas of the two stations involved are pointed at each other. Similarly, the receiving channel which guards the frequencies on which a message may be expected from the second station is only opened when the antennas are aligned. The broadcast feature is obtained by sequential synchronous intercepts between station pairs, during which the information is transmitted at a rate sufficient to provide the effect of continuous transmission.

The objects of this invention are attained in a system comprising a plurality of radio stations each having a transmitter and receiver. At each station is a set of directional transmitting antennas and directional receiving antennas in a back-to-back configuration, the two being mounted to rotate at a constant speed about a vertical axis. Clock-controlled motors rotate each antenna array at a constant speed and with a predetermined relative phase angle so that at least once in each revolution a transmitting antenna of one station illuminates a receiving antenna of the other stations. During the brief time a transmitting antenna is face-to-face with a selected receiving antenna a high-speed burst of intelligence is transmitted.

Other objects and features of this invention will become apparent to those skilled in the art by referring to the specific embodiment described in the following specification and shown in the accompanying drawings in which.

Figure 1:
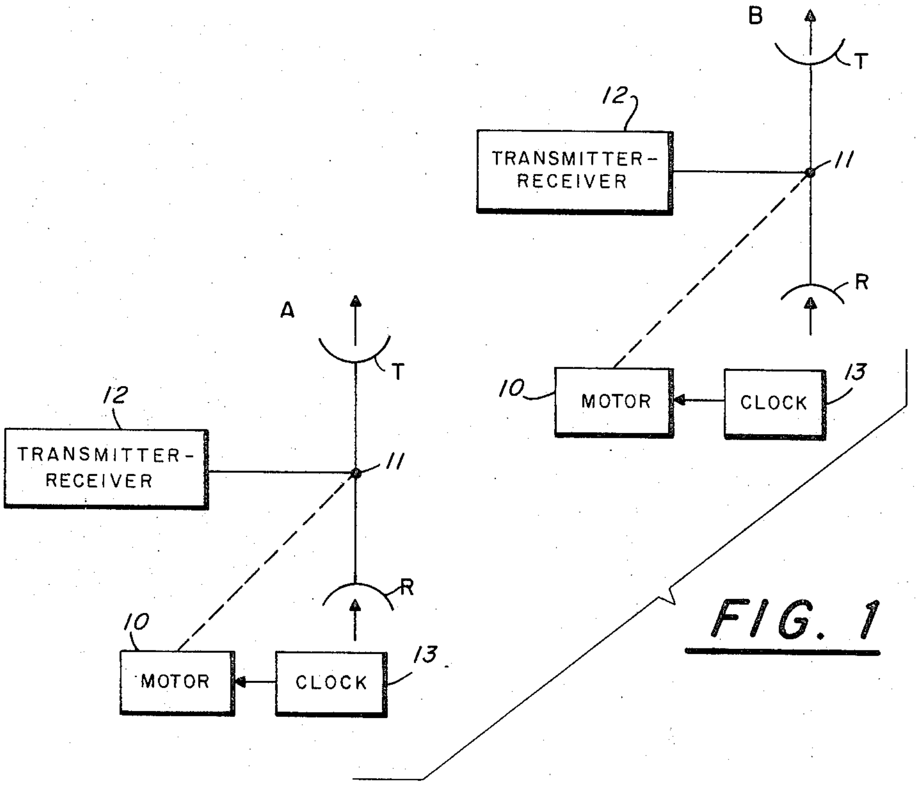
FIG. 1 is a block diagram of two radio stations of the system of this invention.

The system of this invention contemplates a plurality of transmitter-receiver stations which may be shipboard mounted and/or land-based. Two stations A and B are shown in FIG. 1. Each station comprises a motor 10 geared to a vertical shaft 11 upon which is mounted the transmitting directional antenna T and the receiving directional antenna R. The T and R antennas are back-to-back and are trimmed to look exactly 180° apart. Where microwaves are employed for the carrier frequencies the directional antenna can use any appropriate geometric beam-forming shape which is physically rotated, such as conventional parabolic reflectors with focally-placed dipoles or probes, or can use an electronically-scanned array to provide azimuthal coverage by sequential narrow sectors, not necessarily contiguous. Waveguides or other suitable transmission lines connect the antennas to the radio transmitter-receiver pair 12. The motor 10 is synchronous and is precisely controlled in speed by the clock mechanism 13 which is occasionally synchronized with signal pulses from other clocks of the system, to insure that the transmitter-receiver antenna pairs rotate in synchronism.

Figure 2:
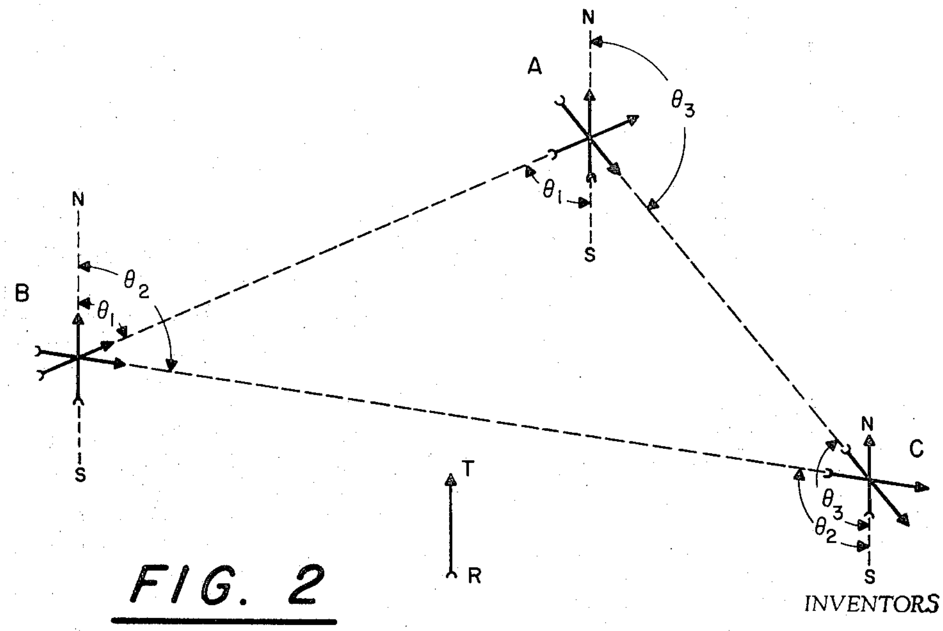
FIG. 2 is a schematic diagram of three stations located arbitrarily with respect to one another, showing the sequential transmitter-receiver pairs for each two-station link.

FIG. 2 shows that if all antenna arrays rotate not only in synchronism but appropriately phased to a common reference (for example, geographic North), then once every revolution each transmitting antenna will look down the bore of each receiving antenna. As suggested in FIG. 2, station B can transmit to station A when the antennas have rotated through angle $\theta_1$ from the reference azimuth. In turn, B transmits to C after all antennas have rotated through angle $\theta_2$, A transmits to C at angle $\theta_3$, and so on. It is contemplated that very high frequencies be employed and that the product beamwidth of the antenna pairs looking at each other be of the order of a few degrees between the half-power points. The end-to-end gain of the two directional antenna T and R of FIG. 2 will then enable free transmission between station pairs during the interval of time when the two antennas are aligned. The duration of this interval, which depends upon the speed of rotation and the beamwidths involved, is of the order of 10 to 100 milliseconds. By employing microwave carrier frequencies and very high information transfer bandwidths of the order of two megacycles, it is possible to achieve average data rates and information capacities comparable to those of high duty cycle systems currently operating at lower frequencies.

It is apparent that two or more pairs of back-to-back transmitter-receiver antennas may be employed in the interest of increased information capacity.

For convenience of illustration, mechanically rotatable antennas have been shown. It is preferred in the interest of reduced weight and bulk that the antennas comprise an array, that they be stationary, and that they be electrically rotatable.

Figure 3:
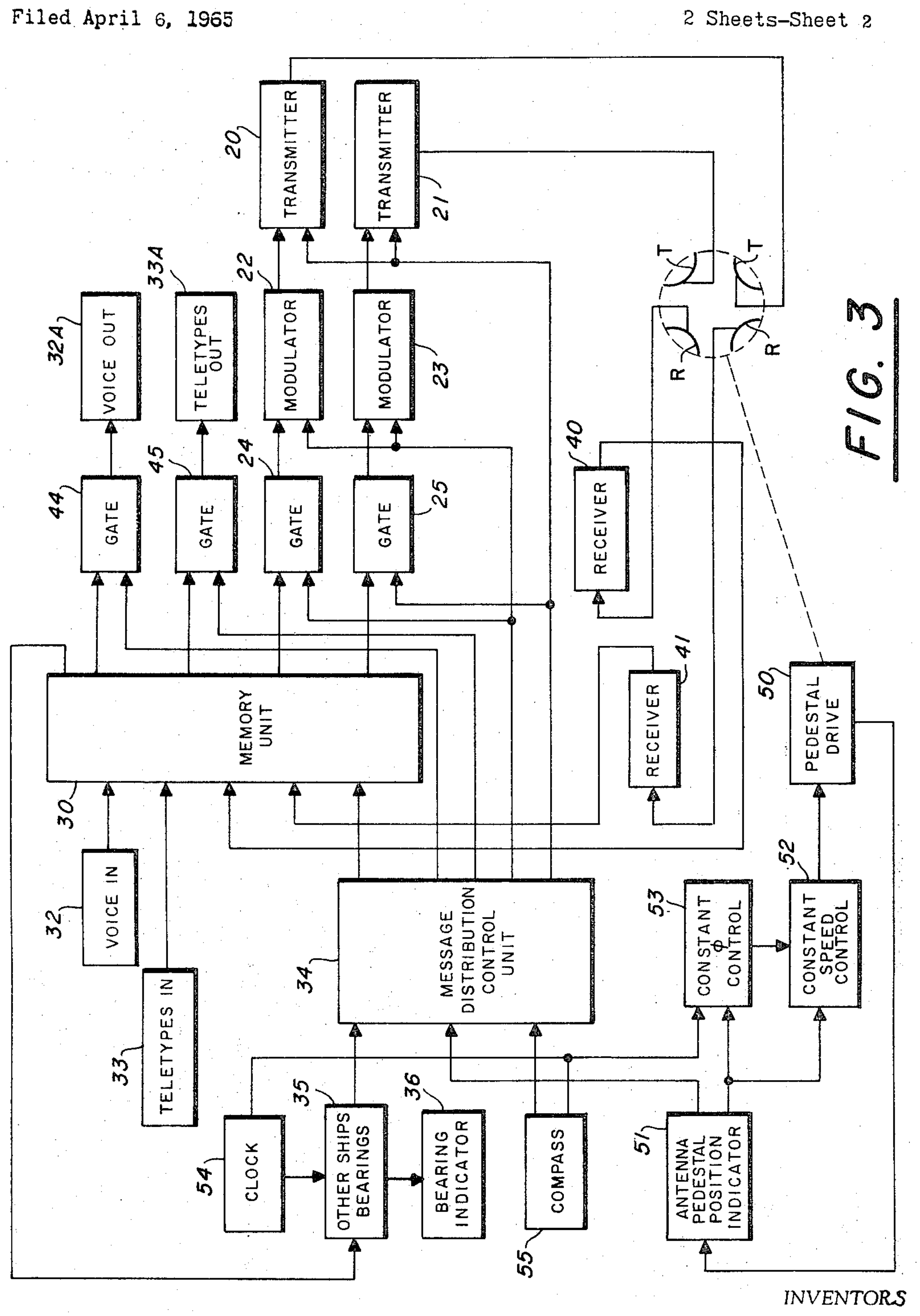
FIG. 3 is a block diagram of one transmitting-receiving station embodying this invention.

The specific station shown by way of example in FIG. 3 comprises two pairs of back-to-back transmitter-receiver antennas. For universal two-way communication between all pairs of ships at sea, all shipboard mounted stations could be the same as shown in FIG. 3. Carrier waves, preferably between 1000 and 8000 mc. are supplied to the transmitting antennas T from the transmitters 20 and 21, respectively. The carrier waves may be amplitude, phase or frequency modulated by the modulators 22 and 23, but the modulation waveform occupies a bandwidth much greater than that of the waveforms supplied by the input devices 32 and 33. As an example, a typical antenna array using 2 transmitting antennas and 2 receiving antennas with one-degree beamwidths on each ship will require a modulation bandwidth 180 times larger than the input bandwidths. For an input pulse stream of 2400 bits per second, the modulation bit rate would be approximately 432,000 bits per second. The actual microwave bandwith required will depend on the modulation and coding methods involved but may be as much as 964 kilocycles per second for simple coding.

In forming a network of stations from a set of ships which enter a general operating area without prior knowledge of each other's relative bearings or time of entry, an automatic acquisition function is provided. Each ship begins by transmitting a coded identification signal repetitively at least once during the time of a beam intercept. For example, the transmission might consist of a relatively short message of about 100 bits sent 20 times at a rate of 432,000 bits per second for a time interval of 5 milliseconds with a burst period of about 30 milliseconds. The coded identification signal is different for each station.

The message distribution control unit 34 periodically interrogates the azimuth registers of memory unit 30 and causes the registers containing received identification signals to be read out to the other ships' bearings unit 35. The other ships bearings unit 35 computes the set of relative bearings along with signals have been received by comparing the relative time of the memory unit readout with the clock 54 which also controls antenna position. The set of azimuths is displayed on bearings indicator unit 36 and also sent as an identification-sorted set to the message distribution control unit 34.

When a signal has been received and identified on any azimuth, the message distribution control unit 34 interrupts the ship's identification transmission on that azimuth and replaces it with a message indicating that a link has been established in one direction and is ready to receive communications. When two stations have acquired each other's bearings and identification, the link is established.

It is contemplated that all intelligence inputs to the transmitter be digitized although this is not essential. The voice source of input 32 should be digitized to be compatible with the teletype signals arriving from the teletypewriter 33. The relatively slow speed pulse trains from 32 and 33 are read into and stored by the memory unit 30. The stored pulses are read out at a much higher rate as required by the ratio of antenna rotation period to the antenna-beam intercept time for the system. Read-out to the transmitters is controlled by the gates 24 and 25 connected respectively in the input circuits of modulators 22 and 23. Gates 24 and 25 are enabled for short intervals of time during each revolution of the antenna, under the control of the message distribution control unit 34. The instant of enabling of the gates 24 and 25 depends upon the azimuthal angle $\theta$ of the addressed station with respect to the transmitting station. The azimuthal position or address of all remote stations is held and continuously updated in memory unit 30 and is selectvely read out to ship's bearing unit 35, from which the bearing of the selected station may be indicated at 36 as well as relayed to the message distribution control unit 34.

In the receiving mode, the received signals from antennas R are fed, respectively, to receivers 40 and 41 where they are demodulated and the digitized signals read into memory unit 30 at high speed. The received pulse train is read out from the memory 30 at a slow speed corresponding to the real time digitized stream provided by input units 32 and 33 at the other end of the link. Gates 44 and 45 for controlling read-out to voice or teletype devices 32A and 33A of received pulses are likewise under the control of the message control unit 34.

The antenna drive system comprises a servo loop including the pedestal drive unit 50 which incorporates a motor and reduction gears. The antenna pedestal position is periodically sampled by unit 51 which supplies antenna azimuth information to the constant-speed control unit 52, which controls the drive motor of 50, and to the phase-control unit 53 which maintains the correct time phase of the rotating antenna pedestal. Phase control unit 53 can be adjusted throughout 360° to bring the antenna into the exact phase relation with the other antennas of the network and provides a means of injecting small phase corrections as the relative azimuths of the other stations change in time. The phase position of the antenna is updated by information from the compass 55 and from the clock 54 which is precisely synchronized with the other clocks of the system.

The feature of burst transmissions of microwave energy which are emitted only within a changing narrow angular sector provides a measure of protection against enemy interception, direction-finding or jamming. The use of the microwave portion of the spectrum permits rapid changes of carrier frequency among a large set of possible frequencies, controlled by programmed pseudorandom sequences. The typical emission from any one station consists of a set of short bits irregularly spaced in time and azimuth and not necessarily all on the same carrier frequency. Even if an intruder knew the frequency-changing sequence, to intercept a transmission between two stations he should be located along the great circle path joining the two stations. And even if he succeeds in obtaining such a fortuitous location, his effects are limited to only that two-station link, leaving other links of the network relatively undisturbed.

The system is also capable of transmitting information back and forth between two stations in a point-to-point mode by using stationary antennas pointed at each other and a multiplicity of input channels. In this mode of operation, the memory unit is not used and the modulation bit rate is similar to that of the real time combined input bit rates. For example, a system with a one-degree product beamwidth might simultaneously accommodate 180 input channels of 2400 bits each, using a modulation bandwidth of 964 kilocycles per second with simple coding. In this mode of operation, a particular station will complete its communications with each other station in the network in turn, slewing the antenna array to the bearing of each desired other station. This mode requires prior knowledge of other ships' bearings and intent to communicate.

This prior knowledge of bearing could be provided by a secondary electronically-scanned small antenna array, the purpose of which is to provide automatic bearing information and identification. Because the identification message has a low information content, the modulation bit rate and receiver bandwidth may be low so that the electronically steerable antenna array need not have the high gain of the communications antenna array.

Many changes may be made in the operating parameters of this system without departing from the scope of the appended claims.

What is claimed is:

1. A secure fleet communication system whereby any two ships of a fleet can communicate by two-way radio without unauthorized interception, said system comprising;

a plurality of mobile stations each station having a radio transmitter and a radio receiver, and each station having at least one pair of directional antennas, the beam patterns of the two antennas of each pair of antennas being directed in opposite directions and being rotatable on a vertical axis so that the antennas sweep the horizon, and the two antennas of each pair being connected respectively to said transmitter and said receiver, a precision clock-controlled drive means continuously rotating the beam of each antenna pair at a constant speed and in phase so that all transmitting beams sweep past a reference azimuth at the same instant, and means for transmitting a high-speed burst of information from the transmitting antenna of one station to the receiving antenna of another station while they are aligned.

2. In the system defined in claim 1, each station comprising;

a storage unit for storing digital signals, signal sources including the output of said receiver of the station, coupled into said storage unit, and a plurality of gates connected between said storage unit and, respectively, readout means and the input of said transmitter of the station, and means for selectively controlling said gates.

3. In the system defined in claim 2;

means for feeding digital information through said gates at a relatively fast rate to said transmitter and at a relatively slow rate to said readout means.

4. The system defined in claim 1 further comprising;

means for advancing or retarding the space phase of said continuously rotating beams of one station to bring the transmitting beam of said one station into alignment with the receiving beam of another selected station.

5. A radio station of the class described for a secure communication system comprising;

a transmitter and a receiver, two directional antennas, each having a relatively sharp beam pattern, the beam patterns being oppositely directed and the antennas being coupled, respectively, to said transmitter and said receiver, and means connected to said antennas for effectively rotating said beam patterns about a vertical axis at a constant speed and with a predetermined rotational phase angle so that the transmitting beam sweeps past a reference azimuth at a predetermined instant of time.

References Cited

UNITED STATES PATENTS

| | | | |
|---|---|---|---|
| 1,437,400 | 12/1922 | Conners. | |
| 2,243,523 | 5/1941 | Davis | 343—100 |
| 2,257,319 | 9/1941 | Williams | 343—100 |
| 2,401,759 | 6/1946 | Hersey | 343—100 |

RODNEY D. BENNETT, *Primary Examiner.*

CHESTER L. JUSTUS, *Examiner.*

H. C. WAMSLEY, *Assistant Examiner.*